United States Patent [19]

Ito et al.

[11] Patent Number: 4,857,499

[45] Date of Patent: Aug. 15, 1989

[54] HIGH TEMPERATURE COMBUSTION CATALYST AND METHOD FOR PRODUCING THE SAME

[75] Inventors: Masamichi Ito, Yokosuka; Akio Ohkoshi, Abiko; Kenjiro Shizukawa, Katori; Terunobu Hayata, Kawasaki; Tomiaki Furuya, Yokohama; Susumu Yamanaka, Kawasaki; Junji Koezuka, Yokohama, all of Japan

[73] Assignees: Kabushiki Kaisha Toshiba, Kawasaki; Tokyo Electric Power Company, Tokyo, both of Japan

[21] Appl. No.: 170,350

[22] Filed: Mar. 18, 1988

[30] Foreign Application Priority Data

Mar. 20, 1987 [JP] Japan ............................... 62-064261
Mar. 20, 1987 [JP] Japan ............................... 62-064262
Mar. 23, 1987 [JP] Japan ............................... 62-065575
Mar. 23, 1987 [JP] Japan ............................... 62-065867

[51] Int. Cl.$^4$ .................... B01J 21/06; B01J 23/10; B01J 23/58; B01J 23/89
[52] U.S. Cl. .................................. 502/326; 502/241; 502/242; 502/250; 502/251; 502/259; 502/260; 502/262; 502/302; 502/303; 502/304; 502/324; 502/327; 502/328
[58] Field of Search ............... 502/250, 259, 303, 304, 502/326, 327, 328, 241, 242, 251, 260, 262, 302, 324

[56] References Cited

U.S. PATENT DOCUMENTS

4,056,489 11/1977 Hindin et al. ..................... 502/303
4,294,726 10/1981 Bozon et al. ...................... 502/304
4,678,770 7/1987 Wan et al. ........................ 502/304

*Primary Examiner*—W. J. Shine
*Attorney, Agent, or Firm*—Foley & Lardner, Schwartz, Jeffery, Schwaab, Mack, Blumenthal & Evans

[57] ABSTRACT

A high temperature combustion catalyst for use in a catalytic combustion type gas turbine combustor and the like, having a superior low temperature ignitionability and a superior thermal durability at a high temperature, which comprises a porous carrier layer, a catalyst component such as palladium and platinum, and first, second and third promoter components, the latter four components being carried on the porous carrier layer, in which the first promoter component includes one of rare earth elements such as lanthanum, cerium, praseodymium and neodymium, alkaline earth metals such as barium, strontium and calcium, and oxides thereof, in which the second promoter component includes magnesium, silicon and oxides thereof, and in which the third promotor component includes one of heavy metals such as nickel, zirconium, cobalt, iron and manganese, and oxides thereof. A method for producing this high temperature combustion catalyst is also disclosed.

18 Claims, 1 Drawing Sheet

HIGH TEMPERATURE COMBUSTION CATALYST AND METHOD FOR PRODUCING THE SAME

BACKGROUND OF THE INVENTION

1. Field of the Invention

The present invention relates to a high temperature combustion catalyst and a method for producing the high temperature combustion catalyst and, more particularly, to a high temperature combustion catalyst for use in a catalytic combustion type gas turbine combustor or the like, which possesses a large activity at a high temperature, a superior low temperature ignitionability, a superior thermal durability at a high temperature and a long life, and a method for producing the high temperature combustion catalyst.

2. Description of the Prior Art

Recently, as petroleum resources and the like have been reduced, for example, fuel such as a mixture gas of natural gas or the like has been desired to be burned at a temperature of as high as possible in a gas turbine combustor.

However, conventionally, a mixture of fuel and air is ignited by using a spark plug to burn the mixture, and a temperature within a combustor is partially raised beyond 2000° C. It is well-known that a large amount of nitrogen oxides (NOx) are produced in such a high temperature portion of the combustor, thereby bringing about a problem such as an environmental pollution.

In order to solve the problem of this kind, a catalytic combustion method in which the mixture of the fuel and the air is burned in the presence of a catalyst, has been proposed. In this case, the mixture gas is burned by virtue of a catalytic action of a platinum group noble metal element such as palladium and platinum. As is well-known, a catalytic reaction utilizing the catalytic action of the noble metal element can be effectively proceeded at a low temperature such as about 300° C. when a sufficient active surface area is ensured. Accordingly, in this catalytic reaction method, the combustion can be initiated at a relatively low temperature and the combustion temperature is gradually raised with no maximal value. In this case, the maximum temperature becomes relatively low such as approximately 1500° C. Hence, when a gas including an oxidizing gas such as the air including nitrogen gas is used for the combustion, the production of the nitrogen oxides can be extremely reduced, and, in the same time, a deterioration of the combustor itself by heat can be prevented.

In general, the noble metal element carried on a carrier is used as a catalytic component. For instance, on a surface of a cordierite carrier substrate having a honey comb shape, an alumina carrier layer for increasing an effective surface area is formed to obtain a carrier body, and then the minute catalyst particles of the noble metal element are carried on the alumina carrier layer of the carrier body to obtain a catalyst. In this case, as the particle size of the noble metal element to be carried on the carrier body is smaller, the low temperature ignitionability of the catalyst is improved much better. However, the heat-resistant temperature of the catalyst is rather low such as below 500° C., for instance, in the temperature range of more than 600° C., the noble metal particles carried on the alumina carrier layer start to aggregate, and the active surface area of the catalyst is reduced, with the result of the lowering of the activity of the catalyst. Further, this phenomenon more remarkably appears as the particle size of the noble metal element becomes smaller.

Further, conventionally, for example, $\gamma$-alumina is applied as an active carrier layer onto a carrier substrate having a certain mechanical strength, and then the noble metal element is carried on the carrier body by an immersion method to obtain a combustion catalyst. However, in this noble metal combustion catalyst, it is said that usually the heat-resistant temperature of the catalyst is approximately 600° C. Therefore, the catalytic activity of this catalyst is rapidly fallen down at more than 600° C. and thus the catalyst cannot be used any more. For the reasons, it is considered that, first, the noble metal particles migrate and aggregate at the high temperature and hence the surface area of the catalyst is reduced, thereby lowering the combustion efficiency of the catalyst, that, second, a phase transition of $\gamma$-alumina to $\gamma$-alumina is taken place at around 1000° C. or more and thus cracks are produced in the alumina carrier layer or between the alumina carrier layer and the carrier substrate, resulting in peeling off the alumina carrier layer together with the catalytic noble metals, and that, third, at around 1000° C., the alumina itself is sintered and pores serving as passages for the gas in the alumina carrier layer are collapsed, thereby burying the catalyst particles in the carrier layer and preventing the catalyst particles from contacting wih the gas.

Then, in order to improve the thermal durability of the noble metal combustion catalyst, the $\gamma$-alumina layer is so improved that platinum particles on the $\gamma$-alumina layer are strongly adsorbed onto the $\gamma$-alumina layer for preventing the migration and the aggregation of the platinum particles at a high temperature and that the phase transition of the $\gamma$-alumina layer to the $\gamma$-alumina is prevented for preventing the above-described cracks. For instance, there has been a conventional catalyst further including a rare earth element carried on an alumina carrier layer in order to prevent a decrease of its surface are due to the combustion heat. In this case, the thermal durability at a high temperature is superior as compared with the aforementioned conventional catalysts, but the thermal durability is incompatible with the low temperature ignitionability at the high temperature in a gas turbine combustor or the like, which is impractical.

Then, in order to solve this problem, other catalysts for a gas turbine combustor further including nickel carried on the alumina carrier layer has been proposed, as disclosed in the Japanese Patent Laying-Open Specifications Nos. 60-19651 and 61-28455. However, in these cases, it is still difficult to simultaneously satisfy the low temperature ignitionability and the thermal durability at the high temperature, and thus they should be further improved.

SUMMARY OF THE INVENTION

Accordingly, it is an object of the present invention to provide a high temperature combustion catalyst for use in a catalytic combustion type gas turbine combustor or the like, having a large activity at a high temperature, a superior low temperature ignitionability, a superior thermal durability at a high temperature and a long life.

It is another object of the present invention to provide a method for producing a high temperature combustion catalyst for use in a catalytic combustion type gas turbine combustor or the like, having a large activity at a high temperature, a superior low temperature ignitionability, a superior thermal durability at a high temperature and a long life.

In accordance with one aspect of the present invention, there is provided a high temperature combustion catalyst comprising a porous carrier layer, a catalyst component and first, second and third promoter components, the latter four components being carried on the porous carrier layer, the first promoter component including one of rare earth elements such as lanthanum, cerium, praseodymium and neodymium, alkaline earth metals such as barium, strontium and calcium, and oxides thereof, the second promoter component including one of magnesium, silicon and oxides thereof, the third promoter component including one of heavy metals such as nickel, zirconium, cobalt, iron and manganese, and oxides thereof.

In accordance with another aspect of the invention, the catalyst component comprises a core including one of the heavy metals such as nickel, zirconium, cobalt, iron and manganese, and oxides thereof, and a catalyst portion attached to the surface of the core, the catalyst portion including at least one of the noble metal elements such as palladium and platinum.

In accordance with another aspect of the present invention, there is provided a method for producing a high temperature combustion catalyst, comprising the steps of preparing a first carrier layer slurry containing a carrier layer component and first, second and third promoter components, mixing a catalyst component into the first carrier layer slurry to obtain a second carrier layer slurry, applying the second carrier layer slurry onto a heat-resistant carrier substrate, and burning the heat-resistant carrier substrate supporting the second carrier layer slurry thereon under suitable conditions, the first promoter component including one of rare earth elements such as lanthanum, cerium, praseodymium, and neodymium, alkaline earth metals such as barium, strontium and calcium, and oxides thereof, the second promoter component including one of magnesium, silicon and oxides thereof, the third promoter component including one of heavy metals such as nickel, zirconium, cobalt, iron and manganese, and oxides thereof.

In accordance with still another aspect of the invention there is provided a method of producing a high temperature combustion catalyst as previously described wherein the catalyst component comprises catalyst particles comprising a core including one of heavy metals such as nickel, zirconium, cobalt, iron and manganese, and oxides thereof, and a catalyst portion attached to the surface of the core, the catalyst portion including at least one of noble metal elements such as palladium and platinum.

BRIEF DESCRIPTION OF THE DRAWINGS

These and other objects, features and advantages of the present invention will more fully appear from the following description of its preferred embodiments with reference to the accompanying drawings, in which.

DESCRIPTION OF THE PREFERRED EMBODIMENTS

The present invention will now be described with reference to its preferred embodiments taken in connection with the accompanying drawings, wherein like reference characters designate like or corresponding parts throughout the several views.

The catalytic efficiency of the conventional catalysts for use in a catalytic combuation type gas turbine combustor or the like have been carefully examined and three main causes of the deterioration of the catalytic efficiency such as a catalytic activity of the catalysts were found as follows:

(1) The carrier layer made of the alumina or the like is sintered at a high temperature, and the catalyst particles made of a noble metal element such as palladium and platinum are buried in the sintered carrier layer. Hence, the function of the catalyst particles cannot be performed.

(2) The catalyst particles migrate and aggregate at the high temperature, and accordingly the active surface area of the catalyst particles is reduced, with the result of the lowering of the catalytic activity of the catalyst particles.

(3) Oxygen in the air does not properly contact with the surfaces of the catalyst particles at the high temperature, and hence the function of the catalyst particles cannot be properly performed.

Then, in order to solve these three causes, researchers and studies have been carried out to obtain the following results. That is, it is considered that as to the first cause (1), a rare earth element such as lanthanum, cerium, praseodymium and neodymium or a mixture thereof, or an alkaline earth metal such as barium, strontium and calcium or an oxide thereof is effectively used as a first promoter component, that as regards the second cause (2), a magnesium, silicon or an oxide thereof is effectively used as a second promoter component, and that concerning the third cause (3), a heavy metal such as nickel, zirconium, cobalt, iron and manganese or an oxide thereof is effectively used as a third promoter component. The present invention has been done on the basis of these facts and will be described in detail in the following.

As regards a heat-resistant carrier substrate to be used in a high temperature combustion catalyst according to the present invention, materials having a stability in a high temperature oxidizing atmosphere of about 1500° C. can be suitably used and may not be restricted to a certain group of materials. For example, ceramic materials such as cordierite, mullite, α-alumina, zirconia and titania can be suitably used. The heat-resistant carrier substrate is used in any form usually used for a catalyst, for instance, a pellet form and a honey comb form.

Regarding a porous carrier layer to be supported on the heat-resistant carrier substrate, materials including a large number of fine pores therein and having a thermal resistivity at a high temperature of about 1500° C. when a carrier layer material having a slurry form is burned, and may not be limited to a certain group of materials. For instance, an inorganic material such as alumina, titania, zirconia, aluminum titanate or silica can be suitably used.

As to a catalyst component to be carried on the porous carrier layer, a noble metal element such as palladium, platinum, rhodium and a mixture thereof can be suitably used. An amount of the catalyst component to be carried on the porous carrier layer with reference to that of the porous carrier layer is suitably determined depending on its using conditions, for example, it is approximately at least 10% by weight, more preferably approximately at least 20% by weight, and stil more preferably approximately at least 30% by weight. The upper limit amount of the catalyst component with reference to that of the porous carrier layer is as small as possible because of an economical reason, and preferably approximately at most 60% by weight.

Concerning the first promoter component to be carried on the porous carrier layer, a rare earth element such as lanthanum, cerium, praseodymium and neodymium or a mixture thereof, or an alkaline earth metal such as barium, strontium and calcium or an oxide thereof, can be suitably used. The lanthanum and the barium may be preferably used. An amount of the first promoter component such as lanthanum and barium to be carried on the porous carrier layer with reference to that of the porous carrier layer is approximately 5% to 20% by weight, calculated in terms of its oxide, and more preferably approximately 10% to 20% by weight.

Regarding the action of the first promoter component, it is considered that the rare earth element such as lanthanum or the alkaline earth metal such as barium acts for preventing the carrier layer such as alumina from sintering at a high temperature. When the carrier layer is sintered, the catalyst component such as palladium and platinum is embedded in the sintered carrier layer and the catalyst component cannot function any more. The first promoter component prevents this problem. The first promoter component such as lanthanum and barium can react on the carrier layer such as alumina to produce a perovskite or a spinel at the high temperature, and thus the amount of the first promoter component to be carried on the carrier layer is determined in consideration of the amount of the first promoter component for producing the perovskite or the spinel.

Next, as to the second promoter component to be carried on the porous carrier layer, magnesium, silicon or an oxide thereof can be suitably used. The magnesium may be preferably used. An amount of the second promoter component to be carried on the porous carrier layer with reference to that of the catalyst component is approximately at most 10% by weight, more preferably approximately at most 5% by weight, and still more preferably approximately at most 2% by weight.

Concerning the action of the second promoter component, it is considered that the magnesium or the silicon can prevent the catalyst component such as the palladium and the platinum from the migration and the aggregation at the high temperature by the sintering. When the catalyst component particles are sintered at the high temperature and aggregate with one another, the active surface areas of the catalyst component particles are reduced, thereby falling down the activity of the catalyst component. It is considered that the second promoter component such as the magnesium and the silicon is carried onto the surface of the catalyst component, its function can be properly.

Then, as regards the third promoter component to be carrier on the porous carrier layer, a heavy metal such as nickel, zirconium, cobalt, iron and manganese or an oxide thereof is suitably used. The nickel may be preferably used. An amount of the third promoter component such as the nickel to be carried on the porous carrier layer with reference to that of the catalyst component is approximately at most 10% by weight, more preferably approximately at most 5% by weight, and still more preferably approximately at most 2% by weight.

Concerning the action of the third promoter component, it is considered that the heavy metal such as the nickel or the oxide thereof acts to properly provide the catalyst component such as the palladium and the platinum with oxygen in the air onto its surface at the high temperature, that is, the oxygen in the air is activated on the surface of the heavy metal or the oxide thereof so as to properly contact with the catalyst component. Hence, the heavy metal or the oxide thereof is preferably positioned on the surface of the catalyst component or is necessarily positioned near the catalyst component, and it is already confirmed that the heavy metal or the oxide thereof does not show the above described function when it is separated far from the catalyst component. In order to properly perform the function of the heavy metal or the oxide thereof, the heavy metal or the oxide thereof is preferably positioned within a distance of at most 100 Å apart from the catalyst component. However, when the catalyst component such as palladium and the third promoter component such as nickel are carried on a carrier layer such as the zirconia having a good nature for transmitting the oxygen iron at the high temperature, the function of the third promoter component can be performed without any restriction of the distance between the catalyst component and the third promoter component.

The second and third promoter components are preferably attached to the surface of the catalyst component, and accordingly the particle sizes of the second and third promoter components are preferably smaller.

The second promoter component such as the magnesium or third promoter component such as the nickel can react with the carrier layer such as the alumina to produce the spinel at the high temperature. Therefore, when the amount of the second or third promoter component carried on the carrier layer is too small, almost all of the second or third promoter component is spent for producing the spinel, resulting in that the function of the promoter component cannot be performed. On the other hand, when the amount of the second or third promoter component to be carried on the carrier layer is too much, the second or third promoter component covers the surfaces of the catalyst components, and thus the function of the second or third promoter component cannot be properly exhibited. Accordingly, the amount of the second or third promoter component to be carried on the carrier layer is determined in consideration of these facts.

The tendency of the reaction of the promoter components with the carrier layer to produce the spinels depends on kinds of the carrier layers, and some carrier layers are liable to react but some carrier layers are not liable to react. For instance, the titania and the silica are apt to react with the promoter components such as magnesium and nickel, and the alumina is not so liable to react with the promoter components as compared with the titania and the silica. The zirconia and the aluminum titanate are somewhat difficult to react with the promoter components.

Then, methods for producing a high temperature combustion catalyst according to the present invention will now be described in detail.

First, a first method for producing the high temperature combustion catalyst according to the present invention will be described. In this method, the carrier layer containing the first promoter component such as lanthanum and being supported on the carrier substrate is impregnated with the catalyst component such as the palladium and the platinum and the second and third promoter components such as magnesium and nickel in a solution in the same time.

Firstly, an alumina slurry including an oxide or salt of the first promoter component such as the rare earth element and the certain alkaline earth metal is applied onto the surface of the heat-resistant carrier substrate, and then the carrier substrate supporting the alumina slurry thereon is dried and then burned at a temperature of preferably approximately 600° C. to 1000° C. to prepare an alumina carrier layer including the rare earth element or the alkaline earth metal therein on the carrier substrate. Then, the carrier substrate supporting the alumina carrier layer thereon is immersed into a solution containing a compound of a noble metal element catalyst such as palladium and compounds of the second and third promoter metal elements such as magnesium and nickel in order to carry the noble metal element and the second and third promoter metal elements on the carrier layer in the same time. In this embodiment, for example, chlorides, nitrates or ogranometallic compounds may be preferably used as the compounds of the noble metal element and the second and third promoter metal elements. Then, the immersed carrier substrate carrying the noble metal element and the second and third promoter metal elements on the carrier layer is burned as a whole at a temperature of approximately 700° C. to 1000° C. to obtain the high temperature combustion catalyst according to the present invention.

In this case, it is considered that, when the catalyst component of the noble metal element such as palladium and the second and third promoter components such as the magnesium and the nickel are carried on the carrier layer in the same time, the catalyst component and the second and third promoter components are uniformly dispersed and carried on the carrier layer. Accordingly, the minute particles of the noble metal element are mutually separated from one another at a sufficient distance. Further, it is considered that the reduction of the surface areas of the catalyst particles are well restrained by the actions of the three promoter components, that is, the dispersed catalyst particles are maintained at the mutually separated distances at the high temperature by the actions of the three promoter components. Thus, it is expected that the thermal durability is highly improved in the catalyst. Therefore, according to the present invention, a high temperature combustion catalyst having a superior thermal durability at a high temperature can be produced.

Next, a second method for producing a high temperature combustion catalyst according to the present invention will be described in detail.

A first step of this method is a preparation of a solution containing a carrier layer material such as aluminum, a catalyst component of a noble metal element such as palladium, and first, second and third promoter components such as lanthanum, magnesium and nickel.

In this case, the contents of the components in the solution are determined with reference to a unit volume of the carrier substrate supporting the components, that is, preferably approximately 50 to 200 g/l of the carrier layer such as alumina, 20 to 200 g/l of the catalyst component such as palladium, 10 to 50 g/l of the first promoter component, 20 to 60 g/l of the second promoter component and 50 to 100 g/l of the third promoter component.

When the solution is prepared in practice, a solution of the aluminum for the alumina raw material is firstly prepared, and then raw materials of the catalyst component such as palladium, and the three promoter components such as the rare earth element or the alkaline earth metal, the magnesium or the silicon, and the heavy metal are added into the solution in their water soluble salt forms.

A second step of this method is a coprecipitation of the alumina, the catalyst component of the noble metal element, and the three promoter components such as the rare earth element or the certain alkaline earth metal, the magnesium or the silicon, and the heavy metal in the solution. In this step, these components are coprecipitated in the form of hydroxides by adjusting the pH of the solution to approximately 6.5 to 7.0. In this time, the catalyst component of the noble metal element and the promoter component elements or metals are preferably formed in neutral hydroxides separate from the aluminum, but may be attached to the hydroxide of the alumina in their ion forms.

A third step of this method is a preparation of an alumina slurry containing the catalyst component of the noble metal element and the three promoter component elements or metals from the obtained coprecipitate. The coprecipitate separated from the solution is dried and then burned. Then, the burned coprecipitate is milled to produce a powder of the alumina containing the catalyst component and the three promoter components. Then, a small amount of alumina sol is mixed with the powdery alumina to produce the alumina slurry.

A further step of this method is an application of the obtained alumina slurry onto the carrier substrate. A coating, immersion, spray or another proper method may be utilized for applying the alumina slurry onto the carrier substrate, and an application amount of the alumina slurry onto the carrier substrate is suitably determined depending on the shape, the size, the weight and so forth of the carrier substrate. The alumina slurry is applied onto the carrier substrate in a suitable manner.

A fifth step of this method is a burning of the carrier substrate carrying the alumina slurry. That is, the carrier substrate carrying the alumina slurry is dried and then burned under predetermined conditions to obtain the high temperature combustion catalyst according to the present invention.

In this method, since the hydroxides of the aluminum, the catalyst component such as palladium and the three promoter component elements or metals are coprecipitated in the mutually and uniformly admixed form in the coprecipitation step, when the obtained coprecipitate is dried, burned, milled, slurried and then applied onto the carrier substrate, the catalyst component such as palladium and the three promoter component elements or metals are arranged in the hydroxide forms in the mutually and uniformly admixed manner in the hydroxide of the alumina.

Then, when this alumina carrier layer supported on the carrier substrate is dried and the burned, the alumina itself forms a porous layer with fine pores having approximately a 100 Å to 500 Å pore size. Since the catalyst component such as palladium and the three promoter component elements or metals are uniformly dispersed and admixed in the alumina, they are uniformly carried on the entire surfaces including the surfaces of the internal pores of the porous alumina layer in their fine particle forms having a several 10 Å to 1000 Å particle size.

Then, when the high temperature combustion catalyst produced by the second method of the present invention is compared with the high temperature combustion catalyst produced by the first method of the present invention, the catalyst component can be carried on not only the surfaces of the carrier layer but also the internal pore surfaces of the carrier layer in the second producing method, while only a small amount of the catalyst component can be carried on the internal pore surfaces of the carrier layer in the first producing method. Accordingly, in the second producing method, a larger quantity of the catalyst component can be uniformly carried on the carrier layer as compared with the first producing method described above.

Therefore, it is readily understood that there is a large active surface area in the catalyst produced by the second method, and thus the combustion reaction may be proceeded at a high efficiency when the catalyst is used in a gas combustor. Further, the catalyst component is uniformly dispersed and carried on the carrier layer, and hence the combustion efficiency of the catalyst cannot be fallen down even when the catalyst is used for a long time under a high temperature.

Then, a third method for producing a high temperature combustion catalyst according to the present invention will be described in detail. In this method, first, a solution containing an inorganic carrier layer material together with first, second and third promoter components such as a rare earth element or a certain alkaline earth metal, magnesium or silicon, and a heavy metal is prepared, and then these components are coprecipitated in the solution. Then, an inorganic slurry is prepared from the coprecipitate, and then a fine particle catalyst component having a predetermined average particle size is blended into the inorganic slurry. Then, the obtained inorganic slurry is attached to a carrier substrate, and then the carrier substrate carrying the inorganic slurry is burned under certain conditions to produce the high temperature combustion catalyst including a large number of fine pores in the carrier layer, in which the average particle size of the fine particle catalyst component is larger than an average pore size of the fine pores of the carrier layer.

A first step of this method is a preparation of the solution containing the inorganic carrier layer material together with the three promoter components such as the rare earth element or the certain alkaline earth metal, the magnesium or the silicon, and the heavy metal. When the solution is prepared, a solution containing the inorganic carrier layer material is firstly prepared and then raw materials of the three promoter components are added into the solution in their water soluble salt forms.

A second step of this method is a coprecipitation of the inorganic carrier layer material and the three promoter components such as the rare earth element or the certain alkaline earth metal, the magnesium or the silicon, and the heavy metal in the solution in order to produce an inorganic slurry. In this step, the components are preferably coprecipitated in the form of hydroxides by adjusting the pH of the solution to approximately 6.5 to 7.0 to produce the inorganic slurry. On this occasion, the three promoter component elements or metals are preferably formed in neutral hydroxides separate from the inorganic material, but may be attached to the hydroxide of the inorganic material in their ion forms.

In this case, the first and second steps may be varied depending on the shapes and properties of the three promoter components. That is, the purpose of these steps is to produce the inorganic slurry containing the three promoter components which are uniformly dispersed in the inorganic slurry, and hence another method may be employed as long as this purpose can be attained.

A third step of this method is a blending of the fine particle catalyst component of the noble metal such as palladium and platinum, which is independently prepared, with the inorganic slurry containing the three promoter components therein.

In this method, the average particle size of the fine particles of the catalyst component is generally designed to be larger than the average pore size of the fine pores of the porous inorganic carrier layer, and further it is desirable that the distribution of the particle sizes of the catalyst particles does not overlap with that of the pore sizes of the fine pores of the porous carrier layer. In other words, widths of both distribution curves of the particle sizes of the catalyst particles and the pore sizes of the pores of the porous carrier layer are desirably narrow. When the average particle size of the catalyst particles is smaller than the average pore size of the pores of the carrier layer, the catalyst particles may migrate within the pores at the high temperature by the combustion heat and aggregate with one another to grow larger, resulting in reducing the surfaces areas of the catalyst particles and further, in the worst case, in breaking down the carrier layer.

In this embodiment, the average pore size of the fine pores of the porous carrier layer is approximately 150 Å to 300Å, and the average particle size of the catalyst particles is preferably approximately 0.05 μm to 10 μm.

The amount of the catalyst particles carried on the carrier layer with reference to a unit volume of the carrier substrate is preferably approximately at least 50 g/l, and more preferably approximately at least 100 g/l.

A fourth step of this method is an application of the obtained inorganic slurry onto the carrier substrate. This step is carried out in the same manner as that of the second producing method described above.

A fifth step of this method is a burning of the carrier substrate supporting the inorganic slurry thereon to produce a large number of fine pores in the inorganic carrier layer.

In this method, it is already known from an experience that, when the burning temperature or the burning time is increased, the average pore size of the pores in the carrier layer is increased. Accordingly, the burning conditions such as the burning temperature and the burning time in the burning step are determined depending on the average pore size of the pores in the carrier layer, and thus the average pore size of the pores in the carrier layer is determined depending on the average particle size of the catalyst particles.

In the third producing method, since the catalyst particles independently prepared are mixed with the inorganic coprecipitate containing the three promoter components such as the rare earth element or the alkaline earth metal, the magnesium or the silicon, and the heavy metal, a greater quantity of catalyst particles can be uniformly carried on the carrier layer as compared with the second producing method described above, and thus an extremely large active surface area can be readily ensured in the catalyst.

Further, in the third producing method, since the average particle size of the catalyst particles is larger than the average pore size of the pores formed in the carrier layer, that is, the catalyst particles having the larger average particle size than the average pore size of the pores in the carrier layer are carried on or are arranged in the pores of the carrier layer, there is no fear that the catalyst particles may migrate in the pores and aggregate with one another even when the temperature is raised during the combustion.

EXAMPLES

Now, Examples of the present invention will be described in detail. First, Examples of the first producing method will be described as follows:

Example 1:

(1) Preparation of a high temperature combustion catalyst:

To alumina sol 125 g including a solid component of 80 % by weight, lanthanum nitrate 24 g was added, and then they were mixed for two hours by using a ball mill to obtain a mixture. The obtained mixture was applied onto a cordierite carrier substrate having a honey comb form (200 cells/inch$^2$, a volume of one liter), and then the carrier substrate supporting the mixture thereon was dried and then burned at 900° C. for five hours to produce an alumina carrier layer carrying the lanthanum therein on the carrier substrate.

Then, in a solution containing palladium chloride 27g, nickel chloride 17 g and magnesium chloride 11 g dissolved therein, the obtained carrier substrate was dipped in order to further carry palladium, nickel and magnesium on or in the carrier layer, and then the carrier substrate taken out of the solution was dried and then burned at 800° C. for three hours, thereby obtaining a high temperature combustion catalyst according to the present invention. The obtained catalyst was treated at 550° C. for three hours in a hydrogen gas atmosphere in order to clean and to activate the surface of the catalyst.

(2) Evaluation test of the catalyst (Gas turbine combustion test):

The obtained catalyst was set in a simulator of a catalytic combustion type gas turbine combustor, and the combustion characteristics of the catalyst were evaluated. Combustion conditions were a gas flow speed of 30 m/sec, a fuel concentration methane of 3% and a catalyst amount of 30 cc. After a combustion for 200 hours, a firing temperature of methane and combustion efficiency were measured, and the obtained results are shown in Table 1.

EXAMPLES 2-19:

High temperature combustion catalysts were prepared in the same manner as Example 1, except that kinds of the catalyst component and the promoter components carried on the carrier layer were varied, as shown in Table 1, and then the evaluation tests of the obtained catalysts were carried out in the same manner as Example 1, and the obtained results are shown in Table 1.

COMPARATIVE EXAMPLES 1-28:

High temperature combustion catalysts were prepared in the same manner as Example 1, except that kinds of the catalyst component and the promoter components carried on the carrier layer were varied, as shown in Table 2, and then the evaluation tests of the obtained catalysts were conducted in the same manner as Example 1, and the obtained results are shown in Table 2.

TABLE 1

| Example No. | Noble Metal (100 g/l) | Promoter Components (I) (20 wt %) | (II) (5 wt %) | (III) (5 wt %) | Combustion characteristics after 200 hours Firing Temp. (°C.) | Combustion Efficiency (%) |
|---|---|---|---|---|---|---|
| 1 | Pd | La | Mg | Ni | 330 | 98 |
| 2 | " | Pr | " | " | 330 | 98 |
| 3 | " | Nd | " | " | 330 | 95 |
| 4 | " | Ce | " | " | 320 | 90 |
| 5 | " | Ba | " | " | 330 | 100 |
| 6 | " | Sr | " | " | 330 | 98 |
| 7 | " | Ca | " | " | 350 | 95 |
| 8 | " | La | Si | " | 330 | 95 |
| 9 | " | Ba | " | " | 330 | 90 |
| 10 | " | La | Mg | Zr | 330 | 100 |
| 11 | " | " | " | Co | 330 | 95 |
| 12 | " | " | " | Fe | 320 | 90 |
| 13 | " | " | " | Mn | 300 | 90 |
| 14 | " | Ba | " | Zr | 350 | 100 |
| 15 | " | " | " | Co | 350 | 95 |
| 16 | Pt | La | " | Ni | 450 | 95 |
| 17 | " | " | " | Zr | 450 | 95 |
| 18 | " | " | Si | Ni | 450 | 90 |
| 19 | " | Ba | Mg | " | 450 | 95 |

TABLE 2

| Comparative Example No. | Noble Metal (100 g/l) | Promoter Components (I) (20 wt %) | (II) (5 wt %) | (III) (5 wt %) | Combustion characteristics after 200 hours Temp. (°C.) | Efficiency (%) |
|---|---|---|---|---|---|---|
| 1 | Pd | La | — | — | 480 | 20 |

TABLE 2-continued

| Comparative Example No. | Noble Metal (100 g/l) | Promoter Components | | | Combustion characteristics after 200 hours | |
|---|---|---|---|---|---|---|
| | | (I) (20 wt %) | (II) (5 wt %) | (III) (5 wt %) | Temp. (°C.) | Efficiency (%) |
| 2 | " | — | Mg | — | 500 | 20 |
| 3 | " | — | — | Ni | 520 | 20 |
| 4 | " | La | Mg | — | 450 | 30 |
| 5 | " | La | — | Ni | 430 | 50 |
| 6 | " | — | Mg | Ni | 480 | 30 |
| 7 | " | Ba | — | — | 500 | 20 |
| 8 | " | Ba | Mg | — | 450 | 30 |
| 9 | " | Ba | — | Ni | 450 | 50 |
| 10 | " | La | La | La | 480 | 30 |
| 11 | " | La | Mg | Mg | 430 | 50 |
| 12 | " | La | Ni | Ni | 400 | 80 |
| 13 | " | Ba | Ba | Ba | 500 | 30 |
| 14 | " | Ba | Si | Si | 480 | 30 |
| 15 | " | Ba | Ni | Ni | 400 | 70 |
| 16 | " | La | Ba | Ni | 400 | 70 |
| 17 | " | Ba | La | Zr | 400 | 70 |
| 18 | " | La | La | Zr | 400 | 70 |
| 19 | " | Mg | Mg | Ni | 480 | 60 |
| 20 | " | Ni | Mg | Zr | 450 | 70 |
| 21 | " | La | Mg | La | 450 | 50 |
| 22 | " | La | Mg | Ba | 450 | 50 |
| 23 | Pt | La | — | — | 550 | 20 |
| 24 | " | — | Mg | — | 550 | 20 |
| 25 | " | — | — | Ni | 550 | 50 |
| 26 | " | La | Mg | — | 530 | 30 |
| 27 | " | La | — | Ni | 500 | 50 |
| 28 | " | — | Mg | Ni | 520 | 50 |

TABLE 3

| | Nobel Metal (100 g/l) | Promoter Components | | | Combustion characteristics after 200 hours | |
|---|---|---|---|---|---|---|
| | | La (wt %) | Mg (wt %) | Ni (wt %) | Firing Temp. (°C.) | Combustion Efficiency (%) |
| Example No. | | | | | | |
| 20 | Pd | 20 | 5 | 5 | 330 | 98 |
| 21 | " | 10 | 5 | 5 | 350 | 98 |
| 22 | " | 5 | 5 | 5 | 380 | 95 |
| 23 | " | 30 | 5 | 5 | 350 | 95 |
| 24 | " | 20 | 10 | 5 | 350 | 98 |
| 25 | " | 20 | 2 | 5 | 320 | 100 |
| 26 | " | 20 | 1 | 5 | 320 | 100 |
| 27 | " | 20 | 5 | 10 | 330 | 98 |
| 28 | " | 20 | 5 | 2 | 330 | 100 |
| 29 | " | 20 | 5 | 1 | 320 | 100 |
| 30 | " | 20 | 2 | 2 | 320 | 100 |
| 31 | " | 20 | 1 | 1 | 320 | 100 |
| Comparative Example No. | | | | | | |
| 29 | Pd | 50 | 2 | 2 | 430 | 80 |
| 30 | " | 5 | 2 | 2 | 450 | 80 |
| 31 | " | 20 | 20 | 5 | 450 | 50 |
| 32 | " | 20 | 50 | 5 | 480 | 40 |
| 33 | " | 20 | 5 | 20 | 450 | 50 |
| 34 | " | 20 | 5 | 50 | 480 | 40 |

Examples 20–31 and Comparative Examples 29–34:

High temperature combustion catalysts were prepared in the same manner as Example 1, except that the amounts of the promoter components were varied, as shown in Table 3, and then the evaluation tests of the obtained catalysts were carried out in the same manner as Example 1, and the obtained results are shown in Table 3.

Then, Examples of the second producing method will now be described in detail.

Example 32:

(1) Preparation of a high temperature combustion catalyst:

Aluminum nitrate 430 g, lanthanum nitrate 65 g, magnesium nitrate 120 g, nickel nitrate 180 g and palladium nitrate 230 g were dissolved in water to prepare a solution. To this solution a certain amount of liquid ammonia was added in order to adjust its pH to approximately 6.5 to 7.0, resulting in simultaneously coprecipitating salts of lanthanum, nickel and palladium attaching to hydroxide cores of alumina. Then, the obtained coprecipitate was filtrated and then washed, and then the corpecipitate was dried at 150° C. for 50 hours and then was burned at 900° C. for two hours.

Next, the burned coprecipitate was milled to produce a powder, and then alumina sol 10 g including a solid component of 80% by weight, with reference to the powdery coprecipitate 100 g, was mixed with the powdery alumina to obtain an alumina slurry.

Then, the obtained alumina slurry 2 g was applied onto a cordierite carrier substrate (25 mmφ×25 mm, 200 cells/inch²) having a honey comb form, and then the carrier substrate supporting the alumina slurry was dried at 120° C. for two hours and then was burned at 1100° C. for four hours in the air, thereby obtaining a high temperature combustion catalyst carrying a porous carrier layer thereon according to the present invention.

(2) Evaluation test of the catalyst:

The evaluation test of the obtained catalyst was carried out in the same manner as Example 1 to measure the combustion characteristics of methane such as the firing temperature and combustion efficiency after a combustion for 500 hours, and the obtained results are shown in Table 4.

Next, Examples of the third producing method will now be described in detail.

Example 33:

(1) Preparation of a high temperature combustion catalyst:

Aluminum nitrate 430 g, lanthanum nitrate 65 g, magnesium nitrate 120 g, and nickel nitrate 180 g were dissolved in water to prepare a solution. To this solution a certain amount of liquid ammonia was added in order to adjust its pH to approximately 6.5 to 7.0, resulting in simultaneously coprecipitating salts of lanthanum and nickel attaching to hydroxide cores of alumina, Then, palladium amicrons 100 g, this catalyst amicron 5a being shown in FIG. 1a, having an average particle size of approximately one μm, independently prepared in the wet reduction method, were added to the coprecipitate, and then the mixture was blended until the palladium amicrons were uniformly dispersed in the coprecipitate to obtain alumina slurry.

Figure 2:
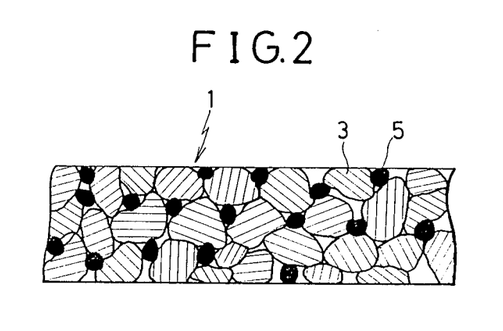
FIG. 2 is an enlarged fragmentary cross sectional view of a porous carrier layer of a high temperature combustion catalyst according to the present invention.

Next, the obtained alumina slurry 2 g was applied onto a cordierite carrier substrate (25 mmφ×25 mm, 200 cells/inch$^2$) having a honey comb form, and then the carrier substrate carrying the alumina slurry was dried at 120° C. for two hours and then was burned at 1100° C. for four hours in the air, to obtain a high temperature combustion catalyst supporting a porous carrier layer thereon, as shown in FIG. 2, according to the present invention.

In this embodiment, as shown in FIG. 2, the porous carrier layer 1 comprises alumina particles 3 with a large number of fine pores, produced by sintering, among the alumina particles, and catalyst amicrons 5 of palladium having the average particle size which is larger than the average pore size of the fine pores. The average pore size of the pores in the carrier layer was approximately 150 Å. The amount of the palladium carried on the carrier layer was approximately 100 g per one liter of the carrier substrate.

(2) Evaluation test of the catalyst:

The evaluation test of the obtained catalyst was performed in the same manner as Example 1 to measure the combustion characteristics of methane such as the firing temperature and combustion efficiency after a combustion for 500 hours, and the obtained results are shown in Table 4.

Figure 1:
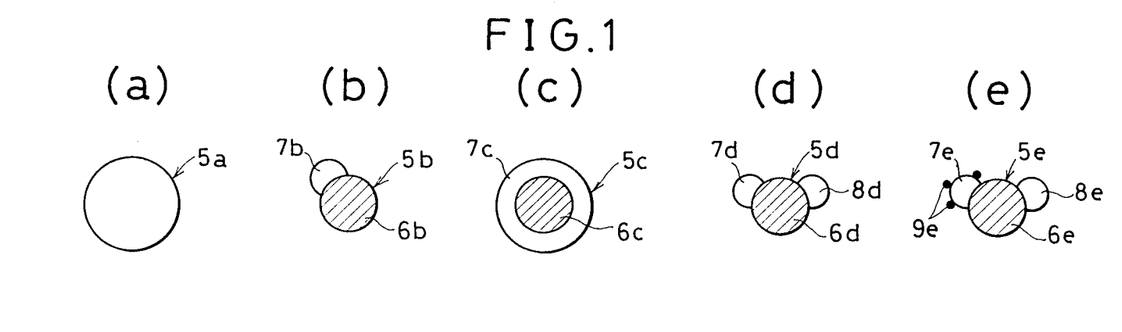
FIG. 1 is an enlarged schematic cross sectional view of catalyst amicrons for use in a high temperature combustion catalyst according to the present invention.

Examples 34–37:

High temperature combustion catalysts were prepared in the same manner as Example 33, except that the catalyst component to be mixed with the alumina slurry was changed from the palladium catalyst amicrons 5a shown in FIG. 1a to catalyst amicrons 5b, 5c, 5d and 5e having structure shown in FIGS. 1b, 1c, 1d and 1e, corresponding to Examples 34, 35, 36 and 37, respectively.

In FIG. 1b, there is shown one catalyst amicron 5b comprising a base or core 6b made of zirconia and a catalyst particle 7b of the palladium, attached to the surface of the core 6b. In FIG. 1c, there is shown another catalyst amicron 5c comprising a core 6c made of nickel oxide and a catalyst surface layer 7c of the palladium, covering the surface of the core 6c. In FIG. 1d, there is shown still another catalyst amicron 5d comprising a core 6d of the zirconia, a catalyst particle 7d of the palladium, attached to the core 6d, and another particle 8d of the nickel oxide, attached to the core 6d separate from the catalyst particle 7d. In FIG. 1e, there is shown a further catalyst amicron 5e comprising a core 6e of the zirconia, a catalyst particle 7e of the palladium, attached to the core 6e, another particle 8e of the nickel oxide, attached to the core 6e separate from the catalyst particle 7e, and fine particles 9e of magnesia, attached to the surface of the catalyst particle 7e. In the above cases, although the zirconia and the nickel oxide are used for the cores 6b, 6c, 6d and 6e, however, for example, other heavy metals, oxides thereof and other materials having a nature for transmitting the oxygen ion or an ability for activating the oxygen may be used for the core. The zirconia can be preferably used for the core. In these embodiments, the average particle size of the catalyst amicrons 5b, 5c, 5d and 5e was approximately one μm.

TABLE 4

| Example No. | Noble Metal (100 g/l) | Promoter Components | | | Combustion characteristics after 500 hours | |
|---|---|---|---|---|---|---|
| | | La (20 wt %) | Mg (5 wt %) | Ni (5 wt %) | Firing Temp. (°C.) | Combustion Efficiency (%) |
| 32 | A | C | C | C | 350 | 95 |
| 33 | B(1) | C | C | C | 330 | 95 |
| 34 | B(2) | C | C | C | 330 | 98 |
| 35 | B(3) | C | C | C | 330 | 98 |
| 36 | B(4) | C | C | C | 320 | 100 |
| 37 | B(5) | C | C | C | 300 | 100 |

*A : Second Producing Method
B : Third Producing Method
C : Coprecipitation
(1): FIG. 1a
(2): FIG. 1b
(3): FIG. 1c
(4): FIG. 1d
(5): FIG. 1e Then, the evaluation tests of the obtained catalysts were conducted in the same manner as Example 33, and the obtained results are shown in Table 4.

It is readily understood from the description of the preferred embodiments of the present invention that according to the present invention, the thermal durability or the catalyst temperature and the combustion efficiency of the high temperature combustion catalyst after a long time use can be remarkably improved without lowering its low temperature ignitionability which is a distinctive feature of a catalytic combustion method. Further, by using the high temperature combustion catalyst of the present invention, the combustion energy can be effectively utilized, and the generation of the nitrogen oxides (NOx) can be also effectively prevented. Therefore, it is expected that the high temperature combustion catalyst of the present invention can be used in various fields, and its industrial value is extremely high.

Further, according to the present invention, since the catalyst particles having the larger average particle size than the average pore size of the pores in the carrier layer, the migration and the aggregation of the catalyst particles upon using at a high temperature for a long time can be prevented, and hence the thermal durability of the catalyst at the high temperature can be extremely improved.

Although the present invention has been described in its preferred embodiments with reference to the accompanying drawings, however, it is readily understood that the present invention is not restricted to the preferred embodiments described above and that the various changes and modifications may be made in the present invention by a person skilled in the art without departing from the spirit and scope of the present invention.

We claim:

1. A high temperature combustion catalyst consisting essentially of a porous carrier layer, a catalyst component and first, second and third promoter components, the latter four components being carried on the porous carrier layer; the catalyst component including at least one noble metal element from the group consisting of palladium and platinum; the first promoter component including at least one substance from the group consisting of lanthanum, cerium, praseodymium, neodymium, barium, strontium, calcium, and oxides thereof; the second promoter component including at least one substance from the group consisting of magnesium, silicon, and oxides thereof; the third promoter component including at least one substance from the group consisting of nickel, zirconium, cobalt, iron, manganese, and oxides thereof.

2. A catalyst as defined in claim 1, wherein the amount of the first promoter component is approximately 5% to 20% by weight, calculated in terms of its oxide, with reference to that of the carrier layer, and the amount of each of the second and third promoter components is approximately at most 10% by weight with reference to that of the catalyst component.

3. A catalyst as defined in claim 1, wherein an amount of the catalyst component is approximately at least 10% by weight with respect to that of the carrier layer.

4. A catalyst as defined in claim 1, wherein the carrier layer includes at least one inorganic material from the group consisting of alumina, titania, zirconia, aluminum titanate and silica.

5. A catalyst as defined in claim 1, further comprising a heat-resistant carrier substrate supporting said porous carrier layer, said carrier substrate including at least one ceramic material from the group consisting of cordierite, mullite, α-alumina, zirconia and titania.

6. A catalyst as defined in claim 1, wherein the average particle size of the catalyst component is larger than the average pore size of pores of the carrier layer.

7. A catalyst as defined in claim 6, wherein the average pore size of the pores of the carrier layer is approximately 150 Å to 300 Å, and the average particle size of the catalyst component is approximately 0.05 μm to 10 μm.

8. A catalyst as defined in claim 7, wherein the catalyst component comprises particles which comprise a core including at least one substance from the group consisting of nickel, zirconium, cobalt, iron, manganese and oxides thereof, and a catalyst portion attached to the surface of the core, the catalyst portion including at least one noble metal from the group consisting of palladium, and platinum.

9. A catalyst as defined in claim 1, wherein the second promoter component includes magnesium, and the third promoter component includes nickel.

10. A method for producing a high temperature combustion catalyst, comprising the steps of:
preparing a first carrier layer slurry containing a carrier layer component and first, second and third promoter components;
mixig a catalyst component into the first carrier layer slurry to obtain a second carrier layer slurry;
applying the second carrier layer slurry onto a heat-resistant carrier substrate; and
burning the heat-resistant carrier substrate supporting the second carrier layer slurry thereon under suitable conditions, the catalyst component including at least one noble metal element from the group consisting of palladium and platinum, the first promoter component including at least one substance from the group consisting of lanthanum, cerium, praseodynmium, neodymium, barium, strontium, calcium and oxides thereof, the second promoter component including at least one substance from the group consisting of magnesium, silicon and oxides thereof, the third promoter component including at least one substance from the group consisting of nickel, zirconium, cobalt, iron, manganese, and oxides thereof.

11. A method as defined in claim 10, wherein the first carrier layer slurry is prepared from a solution containing the carrier layer component and the first, second and third promoter components by coprecipitating these components.

12. A method as defined in claim 10, wherein the amount of the first promoter component is approximately 5% to 20% by weight, calculated in terms of its oxide, with respect to that of the carrier layer, and the amount of each of the second and third promoter components is approximately at most 10% by weight with respect to that of the catalyst component.

13. A method as defined in claim 10, wherein an amount of the catalyst component is approximately at least 10% by weight with respect to that of the carrier layer.

14. A method as defined in claim 10, wherein the carrier layer includes at least one inorganic material from the group consisting of alumina, titania, zirconia, aluminum titanate and silica.

15. A method as defined in claim 10, wherein the heat-resistant carrier substrate includes at least one ceramic material from the group consisting of cordierite, mullite, α-alumina, zirconia and titania.

16. A method as defined in claim 10, wherein an average particle size of the catalyst component is larger than an average pore size of pores of the carrier layer.

17. A method as defined in claim 16, wherein the average pore size of the pores of the carrier layer is approximately 150 Å to 300 Å, and the average particle size of the catalyst component is approximately 0.05 μm to 10 μm.

18. A method as defined in claim 17, wherein the catalyst component further comprises catalyst particles which comprise a core including at least one substance from the group consisting of nickel, zirconium, cobalt, iron, manganese, and oxides thereof, and a catalyst portion attached to the surface of the core, the catalyst portion including at least one noble metal element from the group consisting of palladium and platinum.

* * * * *